(12) United States Patent
Masaki

(10) Patent No.: US 10,498,124 B2
(45) Date of Patent: Dec. 3, 2019

(54) CORD REEL DEVICE AND ELECTRONIC DEVICE

(71) Applicant: Panasonic Intellectual Property Management Co., Ltd., Osaka (JP)

(72) Inventor: Ryota Masaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/278,909

(22) Filed: Feb. 19, 2019

(65) Prior Publication Data

US 2019/0267788 A1 Aug. 29, 2019

Related U.S. Application Data

(60) Provisional application No. 62/634,926, filed on Feb. 26, 2018.

(51) Int. Cl.
*H02G 11/02* (2006.01)
*B65H 75/44* (2006.01)

(52) U.S. Cl.
CPC ......... *H02G 11/02* (2013.01); *B65H 75/4471* (2013.01); *B65H 2701/34* (2013.01)

(58) Field of Classification Search
CPC ............ B65H 75/4431; B65H 2701/33; B65H 75/449; B65H 75/34; B65H 75/4434; B65H 75/446
USPC ...................................................... 174/70 R
See application file for complete search history.

(56) References Cited

U.S. PATENT DOCUMENTS

| 4,284,180 | A * | 8/1981 | Masters | H02G 11/02 191/12.2 R |
| 6,349,808 | B1 * | 2/2002 | Bryant | H02G 11/02 191/12 R |
| 6,517,022 | B1 * | 2/2003 | Bailey | B65H 75/40 242/388.1 |
| 6,884,109 | B1 * | 4/2005 | Ray | H01R 13/72 439/501 |

(Continued)

FOREIGN PATENT DOCUMENTS

| JP | 4-121367 | 4/1992 |
| JP | 8-24182 | 1/1996 |

(Continued)

*Primary Examiner* — Timothy J Thompson
*Assistant Examiner* — Michael F McAllister
(74) *Attorney, Agent, or Firm* — Wenderoth, Lind & Ponack, L.L.P.

(57) ABSTRACT

A cord reel device is a cord reel device for winding a cord in an extendable and retractable manner, and includes an enclosure, a reel, a pin, a support column, and a ring. The reel is rotatably disposed around a rotation axis AX in the enclosure and includes a hollow reel body around which a reel cord can be wound. The reel body has an outer peripheral surface and an inner peripheral surface. The pin extends between the outer peripheral surface and the inner peripheral surface of the reel body, with one end thereof on the outer peripheral surface side being connected with the reel cord. The support column is disposed inside the reel body. The ring is at least partially embedded in the support and disposed so as to be in constant contact with another end of the pin on the inner peripheral surface side.

19 Claims, 8 Drawing Sheets

(56) References Cited

U.S. PATENT DOCUMENTS

| | | | |
|---|---|---|---|
| 7,264,478 B1 * | 9/2007 | Downing | B65H 75/425 191/12.4 |
| 9,917,433 B1 * | 3/2018 | Jiang | H02G 11/02 |
| 9,975,443 B2 * | 5/2018 | Jefferies | H01H 3/16 |

FOREIGN PATENT DOCUMENTS

| | | |
|---|---|---|
| JP | 8-196494 | 8/1996 |
| JP | 2002-137872 | 5/2002 |
| JP | 2003-155168 | 5/2003 |
| JP | 2003-292252 | 10/2003 |
| JP | 2009-179472 | 8/2009 |

* cited by examiner

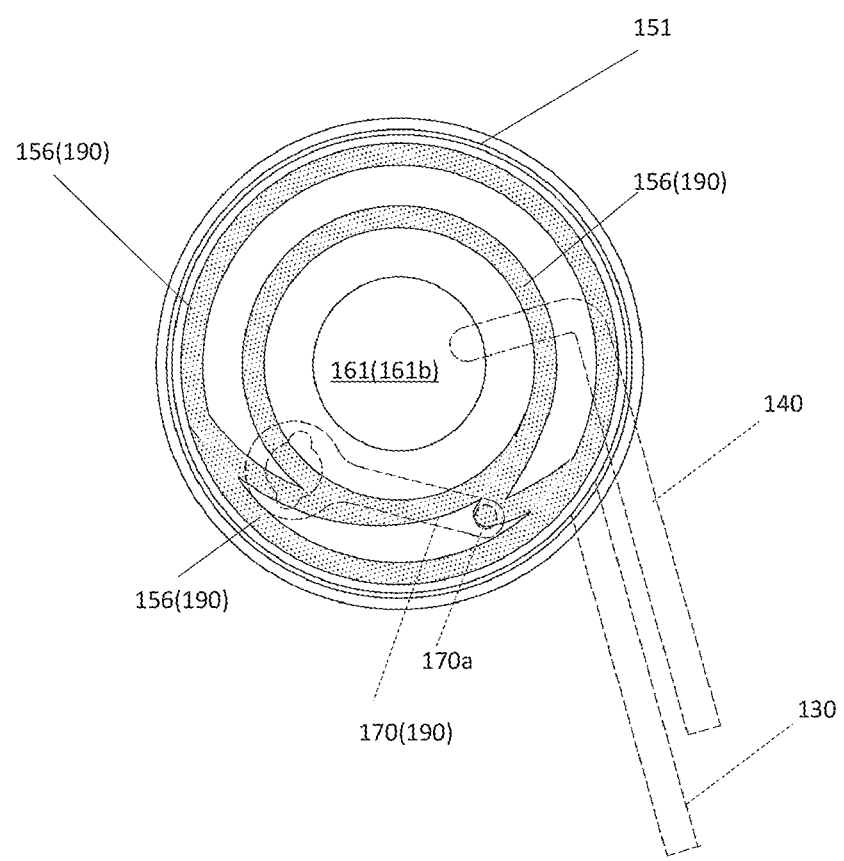

CORD REEL DEVICE AND ELECTRONIC DEVICE

CROSS-REFERENCE TO RELATED APPLICATIONS

This application claims benefit to U.S. provisional application No. 62/634,926, filed on Feb. 26, 2018. The entire disclosure of U.S. provisional application 62/634,926 is hereby incorporated herein by reference.

BACKGROUND

Technical Field

The present disclosure relates to a cord reel device used for various cords such as cables, hoses, and wires that transmit electrical signals and the like, and an electronic device.

Description of the Background

Japanese Unexamined Patent Application No. H08-196494 and Japanese Unexamined Patent Application No. 2003-155168 each disclose a cord reel device having a reel around which is wound a cord that can be extended out, the reel including an electrical contact with the cord.

BRIEF SUMMARY

The present disclosure provides a cord reel device and an electronic device that are effective for miniaturization.

The cord reel device in the present disclosure is a cord reel device for winding a cord in an extendable and retractable manner, and the cord reel device includes an enclosure, a reel, a first conductive portion, a support, and a second conductive portion. The reel is rotatably disposed around a rotation axis in the enclosure and includes a hollow reel body around which the cord can be wound. The reel body has an outer peripheral surface and an inner peripheral surface. The first conductive portion extends between the outer peripheral surface and the inner peripheral surface of the reel body, with one end thereof on the outer peripheral surface side being connected with the cord. The support is disposed inside the reel body. The second conductive portion is at least partially embedded in the support and disposed so as to be in constant contact with another end of the first conductive portion on the inner peripheral surface side.

BRIEF DESCRIPTION OF DRAWINGS

FIG. 7 is a plan view of the control mechanism of the cord reel device.

DETAILED DESCRIPTION

Hereinbelow, an embodiment of the present disclosure will be described in detail referring to the appended drawings. In the following description, the case of a moving body being a commercial aircraft will be described as an example.

1. First Embodiment

Hereinbelow, a first embodiment will be described using FIGS. 1 to 7.

1-1. Configuration

Figure 1:
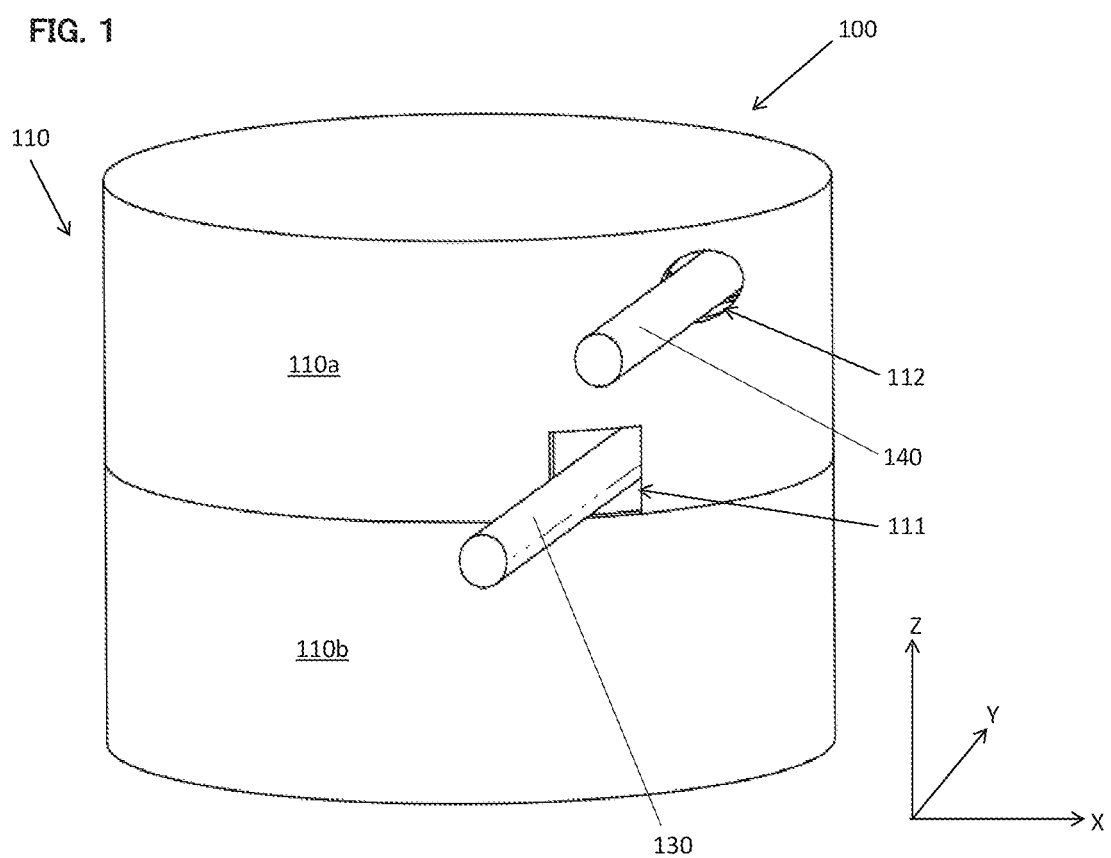
FIG. 1 is an external perspective view of a cord reel device in a first embodiment.
Figure 2:
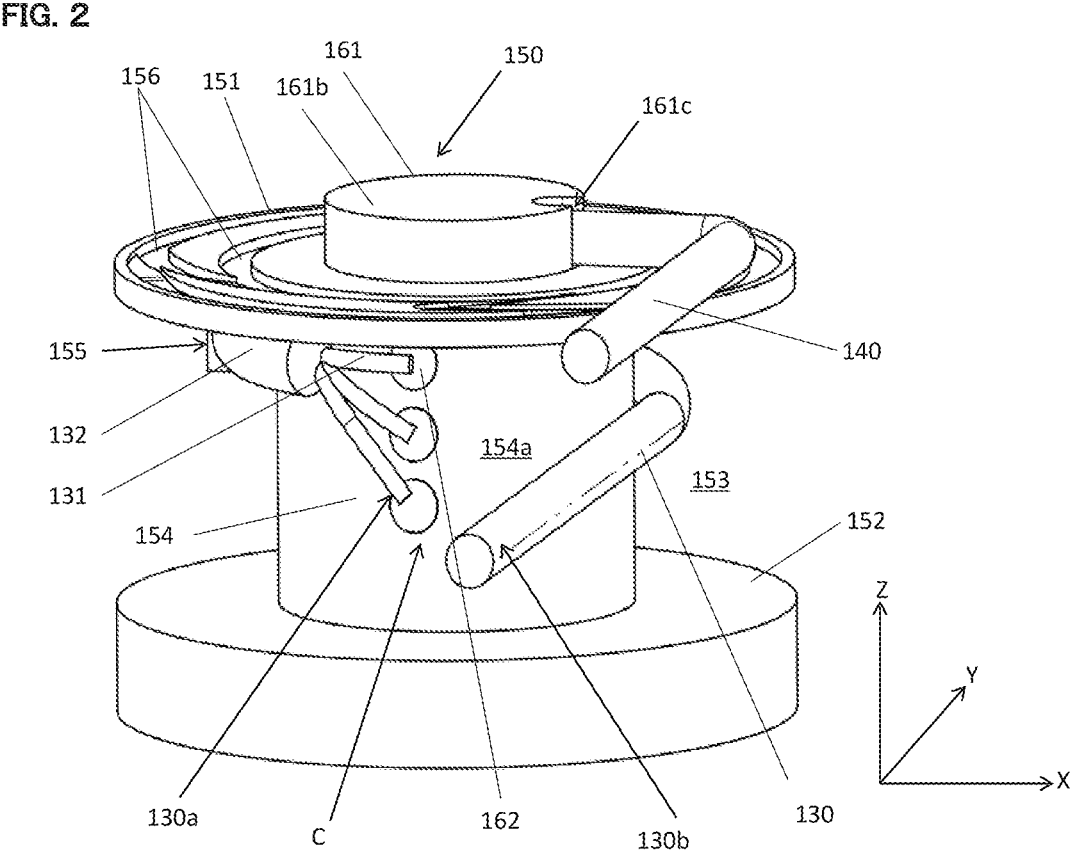
FIG. 2 is a perspective view of a reel in the cord reel device.
Figure 3:
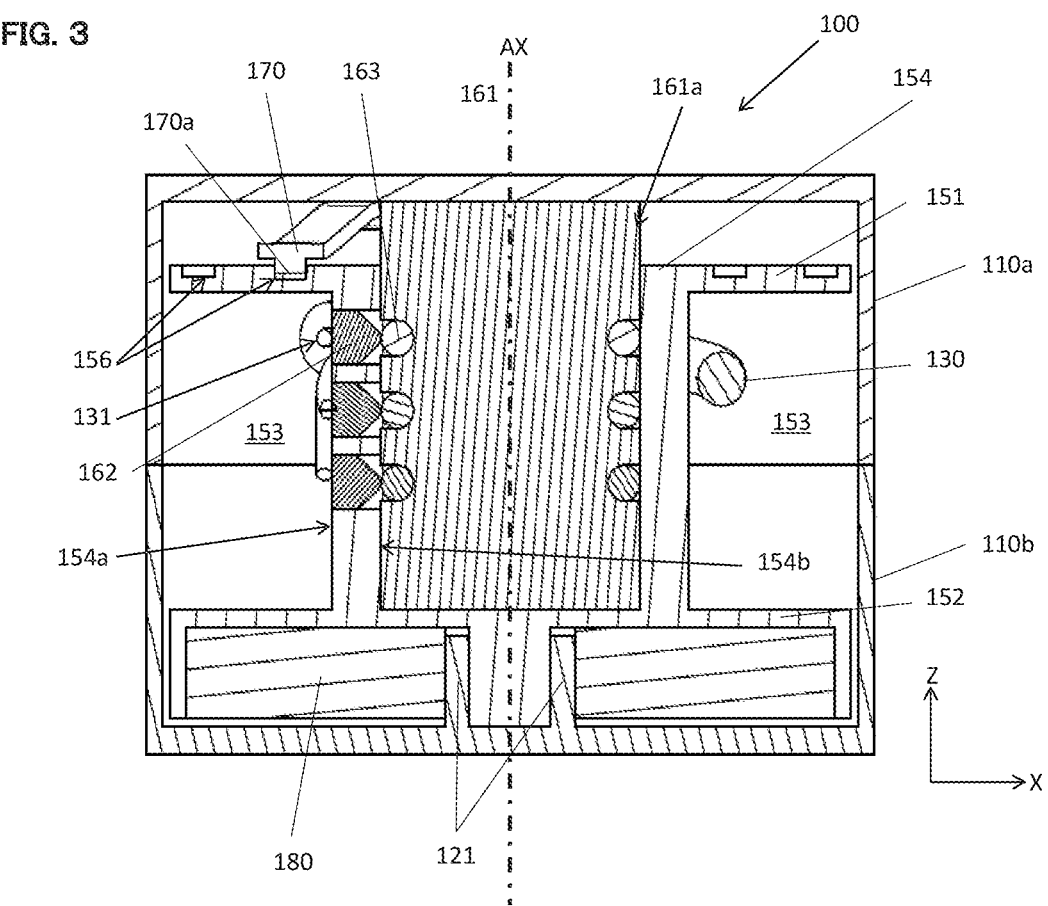
FIG. 3 is an XZ cross-sectional view of the cord reel device.
Figure 4:
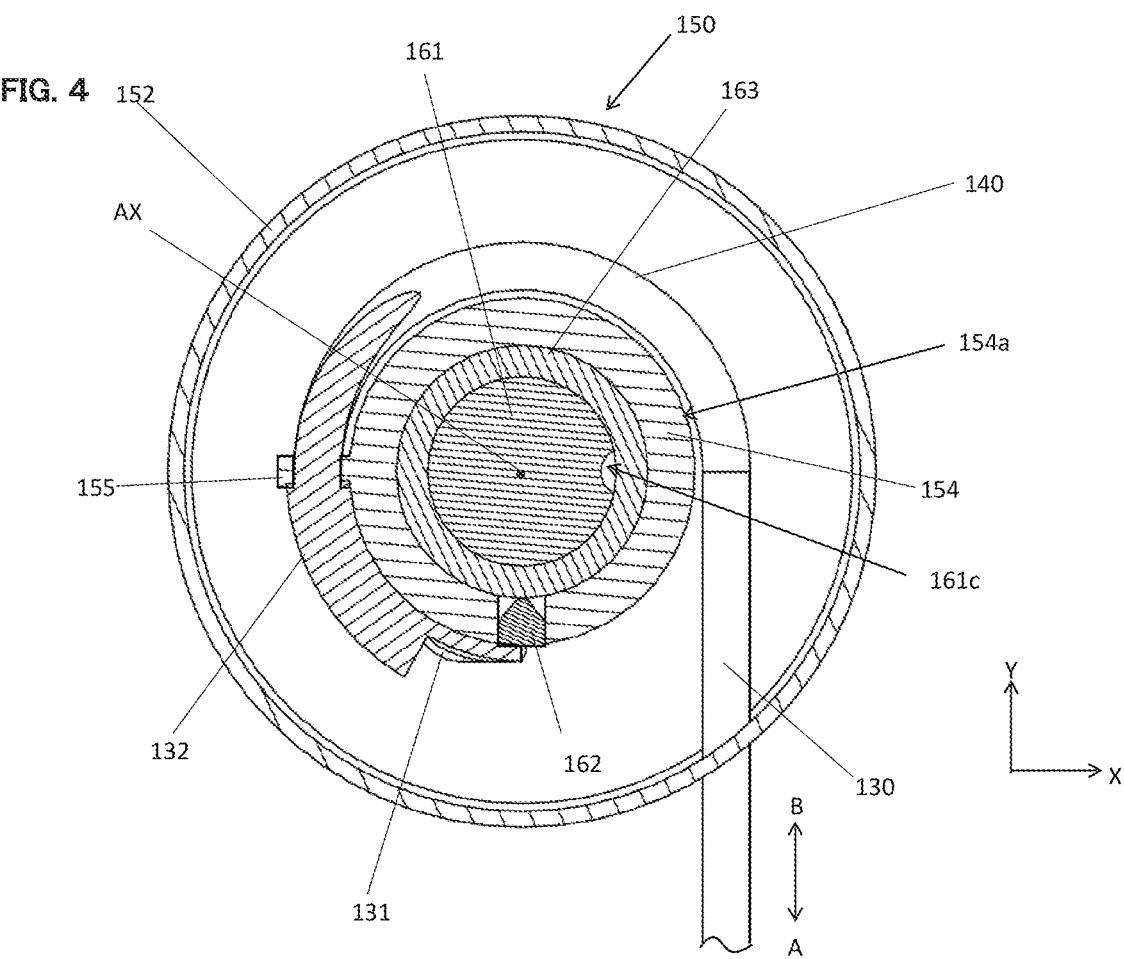
FIG. 4 is an XY cross-sectional view of the reel of the cord reel device.

FIG. 1 is a perspective view of a cord reel device 100 of the first embodiment. FIG. 2 is a perspective view of a reel of the cord reel device 100. FIG. 3 is an XZ cross-sectional view of the cord reel device 100. FIG. 4 is an XY cross-sectional view of the reel in the first embodiment.

The cord reel device 100 is a device for winding a cord in an extendable and retractable manner, and includes an enclosure 110, a reel 150, a support column 161, a pin 162, and a ring 163.

The enclosure 110 accommodates the reel 150. The enclosure 110 includes an enclosure upper part 110a and an enclosure lower part 110b. In the enclosure upper part 110a are located a reel cord opening 111 and a fixed cord opening 112, which each open in a direction orthogonal to a rotation axis AX. A reel cord 130 described later passes through the reel cord opening 111. A fixed cord 140 described later that is connected to an external device passes through the fixed cord opening 112.

The reel 150 is disposed in the enclosure 110 so as to be rotatable around the rotation axis AX (see FIG. 3). The reel 150 includes a hollow reel body 154 around which the reel cord 130 can be wound. As shown in FIG. 3, the reel body 154 has an outer peripheral surface 154a and an inner peripheral surface 154b. The reel 150 further includes a first disk 151 and a second disk 152, which each include a plane substantially perpendicular to the rotation axis AX. The first disk 151 is on an upper end side of the reel body 154 and has a larger diameter than the reel body 154. The second disk 152 is on a lower end side of the reel body 154 and has a larger diameter than that of the reel body 154. A space 153 is thereby formed between the first disk 151 and the second disk 152. The reel cord 130 that is wound around the reel body 154 is accommodated in the space 153.

The reel cord 130 is wound around the reel 150. As shown in FIG. 2, one end 130a of the reel cord 130 is connected to the pin 162. By a user pulling on another end 130b side of the reel cord 130, extending or retracting the reel cord 130 becomes possible as described later. The reel cord 130 includes a signal line 131 for sending a signal (three signal lines are shown in the drawing) and a rubber sheath 132 as protection surrounding the signal line 131. At the one end 130a of the reel cord 130, a small portion of the signal line 131 is exposed from the rubber sheath 132 and connected to the pin 162 exposed on the outer peripheral surface 154a of the reel body 154 of the reel 150. A connection C between the signal line 131 and the pin 162 is located in the vicinity of the first disk 151 and spaced apart from the reel cord opening 111. The connection C is protected with an adhesive (not shown).

Figure 5:
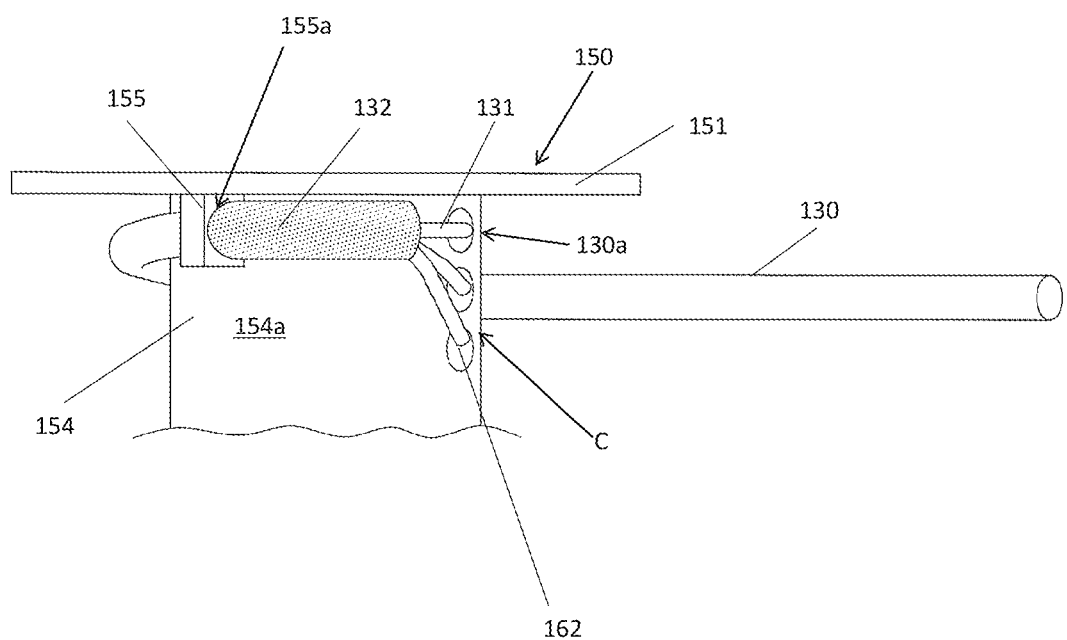
FIG. 5 is a partial side view of the cord reel device.

A predetermined length of the reel cord 130 on the one end 130a side is fixed to the reel body 154. Specifically, as shown in FIG. 5, a rib 155 is formed in the reel 150, on the outer peripheral surface 154a of the reel body 154. The rib 155 has a through hole 155a, with the reel cord 130 passing through the through hole 155a. The reel cord 130 is fixed to the through hole 155a of the rib 155 with an adhesive. With this configuration, a predetermined length of the reel cord 130 on the one end 130a side thereof is prevented from moving while the reel cord 130 is being extended out or retracted, and so the security of the connection between the reel cord 130 and the pin 162 is ensured.

The pin 162 (an example of a first conductive portion) is formed of an electrically conductive material, and is disposed in the reel body 154 of the reel 150. In the present embodiment, three pins 162 are provided to form contact points for the signal lines 131 of the reel cord 130. The three pins 162 are aligned along the rotation axis AX. As shown in FIG. 3, each pin 162 passes between the outer peripheral surface 154a and the inner peripheral surface 154b of the reel body 154. As shown in FIG. 2, one end of each pin 162 on the outer peripheral surface 154a side is connected to the one end 130a of the reel cord 130.

Figure 6:
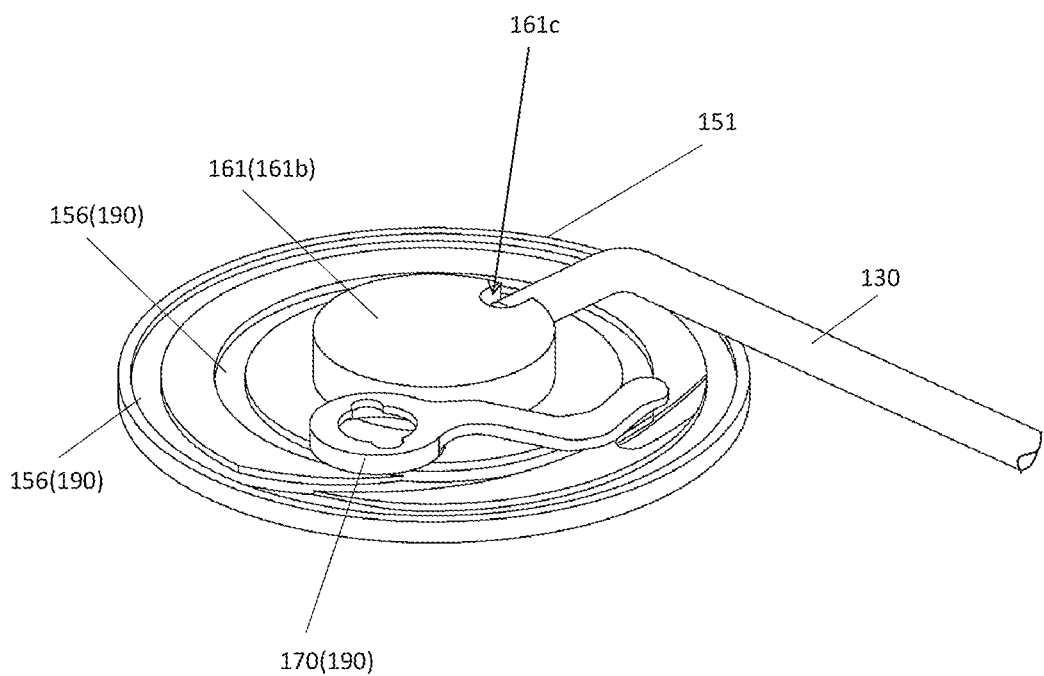
FIG. 6 is a perspective view of a control mechanism of the cord reel device.

The support column 161 (an example of a support) has a solid columnar shape and is disposed in the reel body 154 of the reel 150. The support column 161 is fixed to the enclosure upper part 110a. As shown in FIG. 3, an outer peripheral surface 161a of the support column 161 faces the inner peripheral surface 154b of the reel body 154 of the reel 150. The support column 161 has a projection 161b that extends from the reel body 154 along the rotation axis AX of the reel 150. As shown in FIG. 6, the projection 161b has an opening 161c for extending the fixed cord 140, which is described later.

The ring 163 (an example of a second conductive portion) is made of an electrically conductive material and formed in a ring shape surrounding the rotation axis AX. The ring 163 is embedded along the periphery of the support column 161. Three rings 163 are provided on the support column 161 to form contact points with three pins 162 arranged on the reel body 154 in the present embodiment. The three rings 163 are arranged along the rotation axis AX. Each ring 163 is located at the same position as that of the respective pin 162 along the rotation axis AX, with the ring 163 being in constant contact with the pin 162.

Being in constant contact means being in contact whether the reel 150 is rotating or stationary. That is, a slip ring is constituted by the support column 161, the pin 162, the ring 163, and the reel body 154.

The fixed cord 140 passes through the interior of the support column 161 to be connected to the ring 163 at one end of the cord 140. Another end of the fixed cord 140 is connected to another electronic device, a power supply, or the like.

The cord reel device 100 includes a control mechanism 190 for controlling the extending and retraction of the reel cord 130. The control mechanism 190 is described hereinbelow with reference to FIGS. 3, 6 and 7. The control mechanism 190 includes a groove 156 of a predetermined shape located in the first disk 151 of the reel 150, and a sensor member 170 having a protrusion 170a that is slidable in the groove 156. The sensor member 170 controls rotation of the reel 150 in the extension direction and the retraction direction of the reel cord 130. The sensor member 170 is fixed to the enclosure upper part 110a and is connected so as to be turnable in the radial direction of the first disk 151. The protrusion 170a of the sensor member 170 moves on the groove 156 as the reel 150 rotates. The groove 156 extends in a circumferential direction of the first disk 151, is formed from the outer periphery to the inner periphery, and includes a curve, a step, and a slope. The numbers and shapes of the grooves shown in FIG. 6 and FIG. 7 are not limited to those illustrated and may be others capable of controlling the extension operation and the retraction operation of the reel cord 130, which will be described later.

The cord reel device 100 has a spiral spring 180 (an example of an elastic member) that biases the reel 150 in one rotation direction. As shown in FIG. 3, the spiral spring 180 is arranged inside the enclosure lower part 110b so as to face the second disk 152 along the rotation axis AX of the reel 150. Both ends of the spiral spring 180 are respectively fixed to the second disk 152 and a spring shaft 121 that is located in the enclosure lower part 110b.

1-2. Operation

The operation of the cord reel device 100 configured as described above will be described below. The cord reel device 100 performs an extension operation and a retraction operation on the reel cord 130. Each operation will be described in detail below.

In FIG. 4, the reel 150 is biased in the counterclockwise direction by the spiral spring 180. When the reel cord 130 is extended out in Direction A by the user, the reel 150 rotates clockwise. When the extension force on the reel cord 130 is released, the reel 150 rotates in the counterclockwise direction by the biasing force exerted by the spiral spring 180, and the reel cord 130 is retracted in Direction B. Upon the retraction, the reel cord 130 is wound around the outer peripheral surface 154a of the reel body 154 and accommodated in the space 153.

When the reel cord 130 is being extended out or retracted, since the support column 161 is fixed to the enclosure upper part 110a as shown in FIG. 3, the support column 161 does not rotate and only the reel 150 rotates. The rings 163 fixed to the support column 161 also do not rotate. The pins 162 supported in the reel body 154 of the reel 150 rotate together with the reel 150. Since each pin 162 rotates while maintaining contact with the corresponding ring 163, conduction between the pin 162 and the ring 163 is ensured even during rotation of the reel 150. That is, the extension operation and the retraction operation are performed by rotation of the reel 150 in a state in which the signal lines 131 and the pins 162 are mutually connected and conduction therebetween is secured.

While the reel 150 is rotated in the clockwise direction by the extension operation, the protrusion 170a of the sensor member 170 shown in FIGS. 6 and 7 continues to move on the groove 156. When the extension operation is canceled, the reel 150 rotates in the counterclockwise direction by the biasing force of the spiral spring 180, and the reel cord 130 is retracted. During the retraction, movement of the protrusion 170a of the sensor member 170 is restricted due to the curve, step, and slope formed in the groove 156, with the protrusion 170a being caught at a position. Thereby, the rotation of the reel 150 is stopped and the retraction operation of the reel cord 130 also stops. As a result, a state arises in which an arbitrary length of the reel cord 130 determined by the user is extended out. When the reel cord 130 is again extended out by the user, the protrusion 170a of the sensor member 170 overcomes the restriction in the movement, and the reel 150 rotates in the clockwise direction. The protrusion 170a of the sensor member 170 moves in the groove 156 in accordance with the shape of the groove 156, while turning in the radial direction. Then, the protrusion 170a of the sensor member 170 moves to a position on the groove 156 where the movement is no longer restricted (for example, the outermost groove in FIG. 7). When the protrusion 170a of the sensor member 170 is at the position on the groove 156 where the movement is no longer restricted and the extension force on the reel cord 130 is released, the reel cord 130 is retracted by the biasing force of the spiral spring 180 and is wound around the reel 150 entirely.

Even when the extension operation is being performed, the connection C between the signal line 131 and the pin 162 does not directly receive the force of the extension operation since the rubber sheath 132 of a predetermined length on the one end 130a side of the reel cord 130 is affixed to the outer peripheral surface 154a of the reel body 154 and the rib 155 as shown in FIG. 5.

1-3. Characteristics

In a conventional cord reel device, the need for space inside the reel in order to connect the slip ring and the cord leads to an increase in the size of the reel, which limits the installation place of the cord reel device. In addition, problems arise such as insufficient strength, the greater number of parts, and increase in weight due to the increased size of the reel body. Particularly in a space such as a cockpit of an aircraft where space saving is required, such a problem becomes more serious.

The cord reel device 100 according to the present embodiment is a cord reel device for winding a cord in an extendable and retractable manner, and includes the enclosure 110, the reel 150, the pin 162, the support column 161, and the ring 163. The reel 150 is rotatably disposed around the rotation axis AX in the enclosure 110 and includes the hollow reel body 154 around which the reel cord 130 can be wound. The reel body 154 has an outer peripheral surface 154a and an inner peripheral surface 154b. The pin 162 extends between the outer peripheral surface 154a and the inner peripheral surface 154b of the reel body 154, with one end thereof on the outer peripheral surface 154a side being connected with the reel cord 130. The support column 161 is disposed inside the reel body 154. At least a part of the ring 163 is embedded in the support column 161 and is disposed so as to be in constant contact with the other end of the pin 162 on the inner peripheral surface 154b side of the reel body 154.

In the cord reel device 100 according to the present embodiment, it is possible to arrange a contact point between the pin 162 and the reel cord 130 on nearly the outer peripheral surface 154a of the reel body 154, and to arrange a contact point between the pin 162 and the ring 163 on nearly the inner peripheral surface 154b of the reel body 154. Therefore, the ring 163 and the pin 162 can be disposed close to the reel cord 130, maximizing the length of the reel cord 130 that can be extended out. This allows the length of the reel cord 130 to be as short as possible, and so the space 153 can be minimized and signal deterioration in the cord can be suppressed to a minimum. Therefore, it is possible to achieve miniaturization and weight reduction of the enclosure 110, reduce the enclosure material cost, reduce the cord material cost, and improve signal quality. Further, since the cord reel device 100 can be miniaturized with a simple shape, the strength of the enclosure 110 can also be improved.

With the control mechanism 190, which controls the extension and retraction of the reel cord 130, disposed on the first disk 151 of the reel 150 that provides the space 153 for accommodating the reel cord 130, the reel 150 is able to have a function for stopping retraction of the reel cord 130 within a minimum range. In addition, the groove 156, which is the operation path of the sensor member 170 that adjusts the extension length of the cord, is located on the first disk 151 on one side of the rotation axis AX, and thereby enables further miniaturization of the enclosure 110.

The space for accommodating the spiral spring 180 inside the enclosure 110 on the second disk 152 side allows the spiral spring 180 to be mounted within the minimum range. In this manner, since the space formed by the reel 150 can be effectively utilized, further miniaturization of the enclosure 110 is possible.

Since the rubber sheath 132 and the rib 155 receive the force of the extension operation of the reel cord 130, it is possible to suppress force applied to the connection C between the signal line 131 and the pin 162, and so the reliability of the extension operation is improved.

Since the connection C between the signal line 131 and the pin 162 is protected by an adhesive (not shown), disconnection of the connection C and breakage of the reel cord 130 are prevented. Since the connection C is in the vicinity of the first disk 151 and spaced apart from the reel cord opening 111, deviation of the reel cord 130 toward the vicinity of the reel cord opening 111 of the space 153 is reduced.

2. Other Embodiments

Heretofore, the first embodiment has been described as an example of the technique disclosed in the present application. However, the technique in the present disclosure is not limited to the above embodiment and may also be applied to embodiments which have been subjected to modifications, substitutions, additions, or omissions as required. Moreover, it is also possible to combine the structural elements described in the first embodiment.

Other embodiments will be described as examples below. Since the cord reel devices below are similar to that of the first embodiment, detailed illustrations are omitted and the same reference numerals as in the first embodiment are referred to.

(1)

Figure 8A:
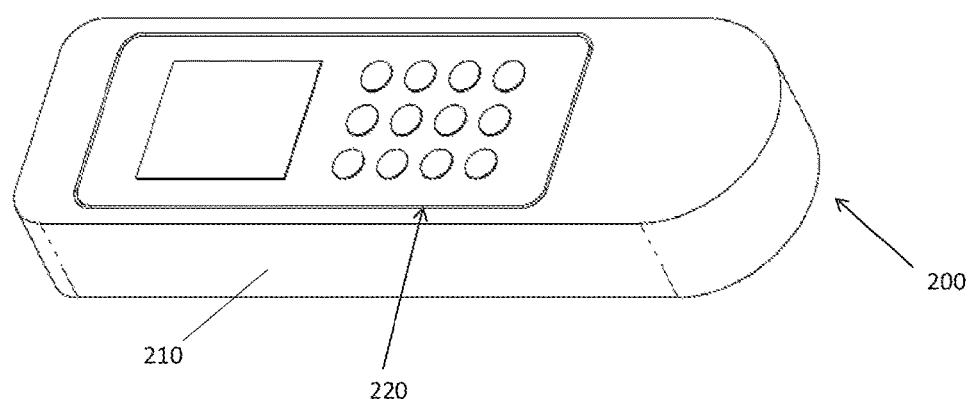
FIG. 8A is a front side perspective view of an electronic device having the cord reel device of the first embodiment.
Figure 8B:
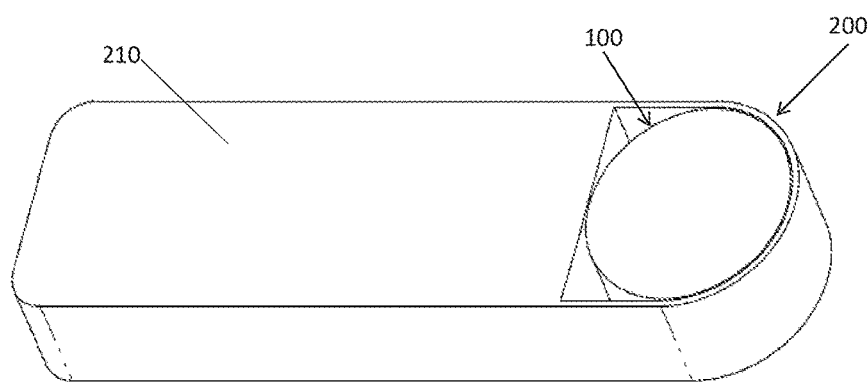
FIG. 8B is a rear side perspective view of the electronic device of FIG. 8A.

FIGS. 8A and 8B are drawings showing an application example of the cord reel device 100 according to the first embodiment. Specifically, FIGS. 8A and 8B show an electronic device 200 in which the cord reel device 100 and a connection device 220 having the cord of the cord reel device 100 connected thereto (for example, a controller that can be operated by a passenger of an aircraft) are integrated.

FIG. 8A shows the front side of the electronic device 200, which is the side that holds the connection device 220, and FIG. 8B shows the rear side of the electronic device 200, which is the side that holds the cylindrical cord reel device 100.

The connection device 220 has a rectangular shape and is connected to the cord of the cord reel device 100. The cord reel device 100 is disposed adjacent to the connection device 220 in the lengthwise direction thereof, with both the connection device 220 and the cord reel device 100 being housed in an enclosure 210. The cord of the connection device 220 is extendable out of and retracted into the cord reel device 100. Moreover, a configuration is possible in which the fixed cord 140 of the cord reel device 100 is connected to an external device (not shown), and the reel cord 130 of the cord reel device 100 is connected to the connection device 220, and electrical signals are transmitted between the devices.

As described above, when the cord reel device 100 having a cylindrical shape and another structure (in this case, the connection device 220) are used in combination, the size of the cord reel device 100 is related to the size of the enclosure 110 (FIG. 1). Therefore, if a reduction in the size of the cord reel device 100 is possible, the enclosure 210 can be miniaturized. As a result, an increase in the degree of freedom with regard to the installation location and an improvement in design can be expected.

(2)

In the first embodiment, a part of the ring 163 may be embedded in the support column 161 or the entirety thereof may be embedded. A part of the pin 162 may be embedded in the reel body 154 or the entirety thereof may be embedded. The contact point between the pin 162 and the ring 163 may be located at a position inside the outer peripheral surface 161a of the support column 161 or at a position outside the inner peripheral surface 154b of the reel body 154.

The above configuration enables miniaturization of the enclosure 110.

(3)

In the first embodiment, the rib 155 having the through hole 155a is an example of a structure for affixing the rubber sheath 132 (FIG. 5), but the rib 155 need only have a shape capable of affixing the rubber sheath. Accordingly, the rib 155 is not limited to the one having a through hole. It is also possible to directly affix the rubber sheath 132 to the outer peripheral surface 154a of the reel body 154 or affix a rib through which the rubber sheath 132 is passed by pressure-fitting. In addition, the rubber sheath 132 may be provided with a function of receiving the force at the time of extending the reel cord 130. Accordingly, the material thereof is not limited to rubber. For example, a resin component or a shrink tube can be used. It is also possible to affix the rubber sheath 132 to the reel body 154 using an adhesive or the like.

(4)

In the first embodiment, three each of the pin 162 and the ring 163 are used, but it is possible to change that number according to the number of signal lines used for communication. As the number of signal lines increases, further miniaturization can be achieved by making connections on the outer peripheral surface 154a of the reel body 154.

(5)

In the first embodiment, the spiral spring 180 is used as the rotation biasing means of the reel 150. However, the rotation biasing means need only have a rotational drive force, and so is not limited to a spiral spring. For example, a motor or a torsion spring could also be used.

(6)

The configuration of the sensor member 170 and the groove 156 need only have a function of stopping the cord retraction operation. For that reason, a protrusion may be used without being limited to a groove. It is also possible to employ a spherical shape or the like for the shape of the sensor member 170. A stop function may also be provided by using a spring or a gear.

In addition, since the function of stopping the cord retraction operation is not always necessary, the disk-shaped member of the reel 150 may be constituted with the enclosure.

(7)

In the first embodiment, the connection C between the signal line 131 and the pin 162 is protected with an adhesive, but a protective tape or the like may be used. Alternatively, it is possible to avoid contact between the connection C and the wound-up reel cord 130 by creating a concavity in the reel body 154 and disposing the connection C in the concavity.

Furthermore, in the first embodiment, the connection C between the signal line 131 and the pin 162 is located in the vicinity of the first disk 151 and spaced apart from the reel cord opening 111, but the present disclosure is not limited thereto. Since it is possible to reduce deviation of the reel cord 130 within the space 153 by adjusting the connection C in accordance with the position of the reel cord opening 111, the location of the connection C is not limited to the vicinity of the first disk 151.

(8)

In the first embodiment, the pin 162 is used as the conductive portion disposed in the reel 150, and the ring 163 is used as the conductive portion disposed in the support column 161, without being limited thereto. A ring-shaped conductive portion may be disposed in the reel 150, and a pin-shaped conductive portion may be disposed on the support column 161.

(9)

The enclosure 110, the reel 150, or the support column 161 in the first embodiment are not limited to have a columnar or cylindrical shape, and may have another shape, for example, a polygonal shape.

(10)

The cord reel device 100 according to the present disclosure can be applied to an apparatus that winds up and stores in a housing having a rotating shaft such as a reel or bobbin a long body such as a transmission cable for electrical signals or a power cord. Specifically, the present disclosure can be applied to a cord reel for an aircraft handset cable, a winding storage structure for a power cord, and the like.

Since the above-described embodiments are for exemplifying the technique in the present disclosure, the embodiments may be subjected to various kinds of modification, substitution, addition, omission, or the like within the scope of the claims and their equivalents.

General Interpretation of Terms

In understanding the scope of the present disclosure, the term "configured" as used herein to describe a component, section, or a part of a device includes hardware and/or software that is constructed and/or programmed to carry out the desired function.

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms "including," "having," and their derivatives. Also, the terms "part," "section," "portion," "member," or "element" when used in the singular can have the dual meaning of a single part or a plurality of parts. Also as used herein to describe the above embodiment (s), the following directional terms "forward", "rearward", "above", "downward", "vertical", "horizontal", "below" and "transverse" as well as any other similar directional terms refer to those directions of a device. The term "circumference" and its derivatives may include a distance or measurement around an outside or an inside of a circle, any other round shape, or any polygonal shape.

Terms that are expressed as "means-plus function" in the claims should include any structure that can be utilized to carry out the function of that part of the present disclosure. Finally, terms of degree such as "substantially," "about," and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected exemplary embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature (s). Thus, the foregoing descriptions of the exemplary embodiments according to the present invention are provided for illustration only, and not for the purpose of limiting the invention as defined by the appended claims and their equivalents.

What is claimed is:

1. A cord reel device for winding a cord in an extendable and retractable manner, comprising:
   an enclosure;
   a reel rotatably disposed around a rotation axis in the enclosure and including a hollow reel body around which the cord is wound, the reel body having an outer peripheral surface and an inner peripheral surface;
   a first conductive portion extending between the outer peripheral surface and the inner peripheral surface of the reel body, with one end thereof on the outer peripheral surface side being connected with the cord;
   a support disposed inside the reel body; and
   a second conductive portion that is at least partially embedded in the support and disposed so as to be in constant contact with another end of the first conductive portion on the inner peripheral surface side;
   wherein
   the cord includes a first cord and a second cord,
   one end of the first cord is connected to the first conductive portion, and the first cord is able to be wound around the reel,
   one end of the second cord is connected to the second conductive portion, and
   the reel has a fixing portion for fixing a predetermined length of the first cord on the one end side thereof to the reel.

2. A cord reel device for winding a cord in an extendable and retractable manner, comprising:
   an enclosure;
   a reel rotatably disposed around a rotation axis in the enclosure and including a hollow reel body around which the cord is wound, the reel body having an outer peripheral surface and an inner peripheral surface;
   a first conductive portion extending between the outer peripheral surface and the inner peripheral surface of the reel body, with one end thereof on the outer peripheral surface side being connected with the cord;
   a support disposed inside the reel body;
   a second conductive portion that is at least partially embedded in the support and disposed so as to be in constant contact with another end of the first conductive portion on the inner peripheral surface side,
   a control mechanism for controlling extension and retraction of the cord, the control mechanism including a groove in a side surface of the first disk on an opposite side of the reel body, and a sensor member having a protrusion that is slidable in the groove,
   wherein the reel includes, along the rotation axis thereof, a first disk on one end side of the reel body, the first disk having a greater diameter than the reel body; and a second disk on another end side of the reel body, the second disk having a greater diameter than the reel body.

3. A cord reel device for winding a cord in an extendable and retractable manner, comprising:
   an enclosure;
   a reel rotatably disposed around a rotation axis in the enclosure and including a hollow reel body around which the cord is wound, the reel body having an outer peripheral surface and an inner peripheral surface;
   a first conductive portion extending between the outer peripheral surface and the inner peripheral surface of the reel body, with one end thereof on the outer peripheral surface side being connected with the cord;
   a support disposed inside the reel body;
   a second conductive portion that is at least partially embedded in the support and disposed so as to be in constant contact with another end of the first conductive portion on the inner peripheral surface side; and
   a member for biasing the reel in one rotation direction, the member being disposed inside the enclosure and facing the second disk along the rotation axis,
   wherein the reel includes, along the rotation axis thereof, a first disk on one end side of the reel body, the first disk having a greater diameter than the reel body; and a second disk on another end side of the reel body, the second disk having a greater diameter than the reel body.

4. The cord reel device according to claim 2, further comprising
   a member for biasing the reel in one rotation direction, the member being disposed inside the enclosure and facing the second disk along the rotation axis.

5. The cord reel device according to claim 2, wherein the support includes a projection projecting from the reel body along the rotation axis, the projection having an opening for extending out the cord.

6. A cord reel device for winding a cord in an extendable and retractable manner, comprising:
   an enclosure;
   a reel rotatably disposed around a rotation axis in the enclosure and including a hollow reel body around which the cord is wound, the reel body having an outer peripheral surface and an inner peripheral surface;
   a first conductive portion extending between the outer peripheral surface and the inner peripheral surface of the reel body, with one end thereof on the outer peripheral surface side being connected with the cord;
   a support disposed inside the reel body; and
   a second conductive portion that is at least partially embedded in the support and disposed so as to be in constant contact with another end of the first conductive portion on the inner peripheral surface side,
   wherein the support is solid.

7. The cord reel device according to claim 2, wherein the first conductive portion is a pin member.

8. A cord reel device for winding a cord in an extendable and retractable manner, comprising:
an enclosure;
a reel rotatably disposed around a rotation axis in the enclosure and including a hollow reel body around which the cord is wound, the reel body having an outer peripheral surface and an inner peripheral surface;
a first conductive portion extending between the outer peripheral surface and the inner peripheral surface of the reel body, with one end thereof on the outer peripheral surface side being connected with the cord;
a support disposed inside the reel body; and
a second conductive portion that is at least partially embedded in the support and disposed so as to be in constant contact with another end of the first conductive portion on the inner peripheral surface side,
wherein the cord includes a first cord and a second cord, one end of the first cord is connected to the first conductive portion, and the first cord is able to be wound around the reel, and one end of the second cord is connected to the second conductive portion, and
wherein the enclosure has two openings that each open in a direction orthogonal to the rotation axis, with the first cord and the second cord passing through the two respective openings.

9. A cord reel device for winding a cord in an extendable and retractable manner, comprising:
an enclosure;
a reel rotatably disposed around a rotation axis in the enclosure and including a hollow reel body around which the cord is wound, the reel body having an outer peripheral surface and an inner peripheral surface;
a first conductive portion extending between the outer peripheral surface and the inner peripheral surface of the reel body, with one end thereof on the outer peripheral surface side being connected with the cord;
a support disposed inside the reel body; and
a second conductive portion that is at least partially embedded in the support and disposed so as to be in constant contact with another end of the first conductive portion on the inner peripheral surface side,
wherein a contact point between the first conductive portion and the cord is on the outer peripheral surface of the reel body or at a position inside the outer peripheral surface of the reel body.

10. The cord reel device according to claim 9, wherein a contact point between the first conductive portion and the second conductive portion is at a position inside of the outer peripheral surface of the support or at a position outside the inner peripheral surface of the reel body.

11. An electronic device comprising:
the cord reel device according to claim 1; and
a device electrically connectable to a power supply or another device via the cord reel device.

12. An electronic device comprising:
the cord reel device according to claim 2; and
a device electrically connectable to a power supply or another device via the cord reel device.

13. An electronic device comprising:
the cord reel device according to claim 3; and
a device electrically connectable to a power supply or another device via the cord reel device.

14. An electronic device comprising:
the cord reel device according to claim 6; and
a device electrically connectable to a power supply or another device via the cord reel device.

15. An electronic device comprising:
the cord reel device according to claim 8; and
a device electrically connectable to a power supply or another device via the cord reel device.

16. An electronic device comprising:
the cord reel device according to claim 9; and
a device electrically connectable to a power supply or another device via the cord reel device.

17. The cord reel device according to claim 3, wherein the support includes a projection projecting from the reel body along the rotation axis, the projection having an opening for extending out the cord.

18. The cord reel device according to claim 3, wherein the first conductive portion is a pin member.

19. The cord reel device according to claim 1, wherein the second conductive portion is ring shaped.

* * * * *